3/9/76 XR 3,942,879
250-203

United States Patent [19]

Pledger

[11] 3,942,879

[45] Mar. 9, 1976

[54] MIRROR STEERING SYSTEM

[75] Inventor: Richard Payne Pledger, Fort Worth, Tex.

[73] Assignee: The United States of America as represented by the Secretary of the Air Force, Washington, D.C.

[22] Filed: Mar. 19, 1975

[21] Appl. No.: 559,863

[52] U.S. Cl. .................... 350/285; 350/6; 250/234; 250/203 R

[51] Int. Cl.[2] G05D 25/00; G02B 27/17; G01J 1/20

[58] Field of Search ........... 350/6, 7, 285, 289, 299, 350/301, 25, 26, 48, 52, 16; 178/7.6; 356/167, 147, 253, 254, 255, 141, 152; 250/203, 235, 236, 234; 248/479–487

[56] References Cited

UNITED STATES PATENTS

| | | | |
|---|---|---|---|
| 2,653,185 | 9/1953 | Lubcke et al. | 250/235 |
| 3,290,985 | 12/1966 | Bains et al. | 350/52 |
| 3,647,276 | 3/1972 | Howell et al. | 250/203 R |

*Primary Examiner*—Alfred E. Smith
*Assistant Examiner*—Jon W. Henry
*Attorney, Agent, or Firm*—Joseph E. Rusz; Henry S. Miller, Jr.

[57] ABSTRACT

A system for steering a mirror, comprising a mirror mounted on a gimbal provided with a steering rod and incorporated into an articulated spatial parallelogram linkage to allow for steering the mirror in a precise and controlled manner.

2 Claims, 4 Drawing Figures

MIRROR STEERING SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the steering of mirrors and, more particularly to a mechanical system especially adapted to reflect and direct an image, beam, or light ray in a precise manner.

Heretofore, the steering of a mirror to reflect and direct an image, beam, light ray, or other incident radiation hereinafter referred to as the "beam" has involved manually or mechanically positioning the mirror in a manner such that the mirror reflects the beam according too the law of mirror reflection, viz: the angle of incidence is equal to the angle of reflection. Accordingly, the angle between the incident reflected rays is twice the angle of incidence, and the normal line to the plane of the mirror bisects this angle. The task of precisely directing a reflected image or beam involves positioning the mirror such that the normal to the mirror bisects the subtended angle between the source of the beam and the desired position of the beam.

In the past, the task of positioning a mirror to direct a reflected beam in a manner such that the beam describes a circular arc on a flat plane, or to direct a beam to a point in space from a radial direction, has required using a cam and cam follower mechanism derived from calculations, or use of electrical signals to drive motors, also derived from calculations involving a suitable space coordinate system.

SUMMARY OF THE INVENTION

The invention provides an improved device for directing mirrors in a precise manner when the beam is not present while further avoiding trial and error and calculating mirror positions. The invention is characterized by a gimbally mounted mirror controlled in part by a steering rod and an articulated spatial parallelgram linkage controlling the movement of the mirror. In an alternative embodiment an articulated arm controls a second mirror for directing a beam to a point in space by positioning the device such that the appropriate axis is coincident with the beam axis.

It is therefore an object of the invention to provide a new improved mirror steering system.

It is another object of the invention to provide a new and improved mirror steering system that will cause impinging radiation to describe a circular arc on a flat plane.

It is a further object of the invention to provide a new and improved mirror steering system that utilizes a plurality of mirrors to direct a beam of radiation to a point in space from a radial direction by means of a spatial rhombic parallelogram linkage.

It is still another ojbect of the of the invention to provide a new and improved mirror steering system that will cause the central ray of an impinging beam of radition to describe a circular arc on a plane.

It is still a further object of the invention to provide a new and improved system for steering mirrors that will direct, steer or aim a beam of incident radiation with two mirrors, toward a fixed point in space.

It is another object of the invention to provide a system for steering a plurality of mirrors toward a fixed point in space such that the central ray of an incident beam intercepts the point from a coplaner or non-coplaner radial direction.

Other and further features and objects of the invention will be more apparent to those skilled in the art upon a consideration of the appended drawings and the following description wherein alternative constructional forms of the apparatus invention are disclosed.

DESCRIPTION OF THE PREFERRED EMBODIMENT

Figure 1:
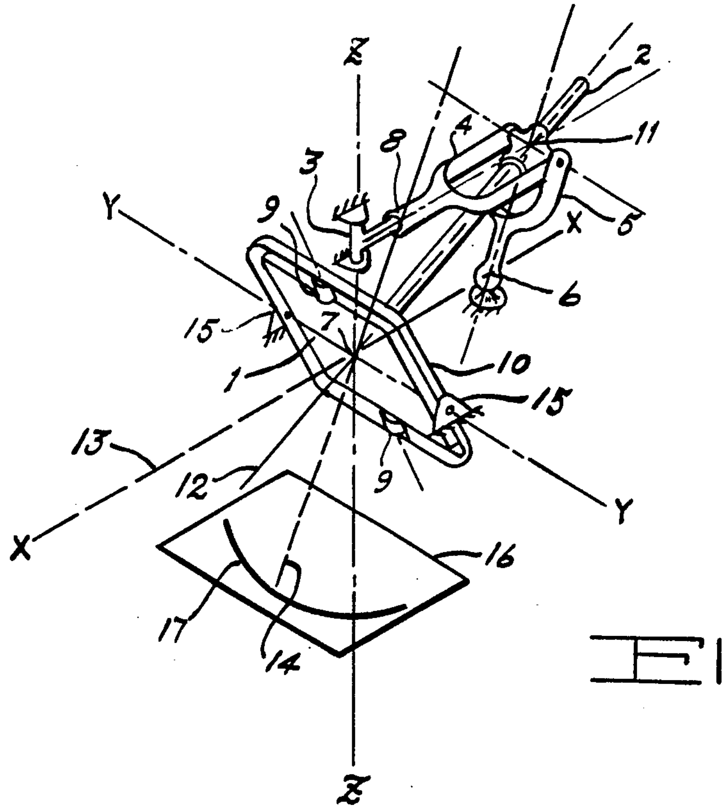
FIG. 1 is an isometric view of the invention.
Figure 2:
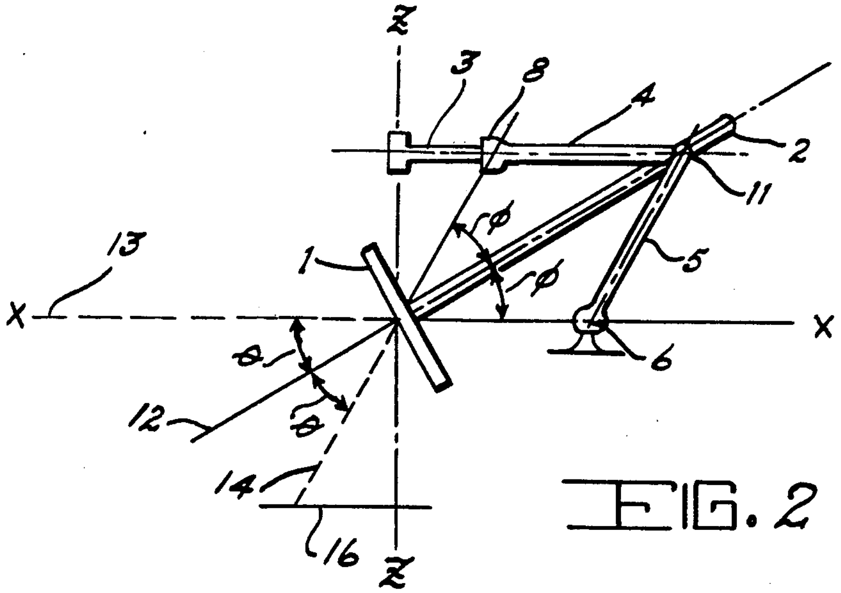
FIG. 2 is a side elevation view of the invention.
Figure 3:
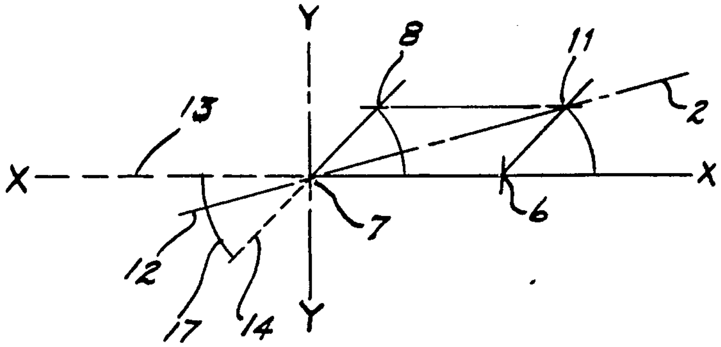
FIG. 3 is a diagrammatic top view of the invention illustrating the geometry of the parallelogram at a displaced position.

Referring now to FIGS. 1 through 3, a mirror shown as 1 is located at the origin 7 of mutually orthogonal axis *x—x*, *y—y*, *z—z*. The mirror is mounted in a gimbal 10 and attached with pivots 9 whereby the mirror is movable about the *z—z* axis in the x plane. Gimbal 10 is pivoted about axis *y—y* on trunnions 15. Connected to the reverse side of the mirror 1 at the origin 7 and forming a normal to the plane of the mirror is rod 2. A bifurcated link 4 is pivotally attached to the slider bearing 11 at one end. At the opposite end, the link is connected to arm 3 by a universal swivel type joint at 8. Another bifurcated link 5 has a universal swivel type joint connection at 6 and is co-mounted with link 4 to the slider bearing 11. Links 4 and 5, along with the fixed length from point 6 to point 7 and the fixed length from point 7 to point 8, form a rhombic parallelogram. Rod 2, connected to mirror 1 passes through and slidably engages bearing 11. Bearing 11 is located at the vertex of the parallelogram opposite the vertex 7. Arm 3 is pivoted and so mounted to rotate about axis *z—z*.

In operation, joint 8 remains at a constant distance from the origin 7 for all angular positions of arm 3. Rod 2 forms a diagonal in the parallelogram 6, 7, 8, 11, bisecting the angle formed by side 6–7 and 7–8 as well as the angle formed by sides 6–11 and 11–8 all clearly shown in FIG. 2.

A beam of radiation having a central ray 13 travelling along an axis strikes the mirror 1 at the origin 7 and forms angle $\theta$ with the mirror normal 12 (an imaginary extension of rod 2) and is reflected by the mirror. The reflected ray 14 forms a similar angle $\theta$ with the normal 12. Hence, the normal 12 is the angle bisector of the angle $2\theta$ between 13 and 14.

If the axis of the central ray 13 is coincident with axis *x—x*, angle $\theta$ will be equal to angle $\phi$ between side 6–7 and rod 2. Likewise, angle $\theta$ between reflected ray 14 and normal 12 will be equal to angle $\phi$ between side 7–8 and rod 2. Reflected ray 14 is then coincident with side 7–8. The relationship of each corresponding angle remains true for all possible angles of reflection. Side or axis 6–7 is the analog of ray 13, side or axis 7–8 is the analog of ray 14, similarly, axis 7–11 along rod 2 is the analog of normal 12, all on the reverse side of the mirror.

Upon rotation of arm 3 about axis *z—z* parallelogram 6-7-8-11 is displaced out of the *x–z* plane, the parallelogram, however, remains planer and remains rhomboid in the skew plane. Rod 2 remains in the plane of the rhomboid. The skew plane determined by rod 2 and axis 6–7 is established by ray 13 and normal 12 on the front side of mirror 1. Axis 7–8 describes a cone, and point 8 describes a circle for displacement of arm 3. Ray 14 describes a cone, and describes a circle on a flat plane 16 parallel to the plane of the circle described by point 8.

Figure 4:
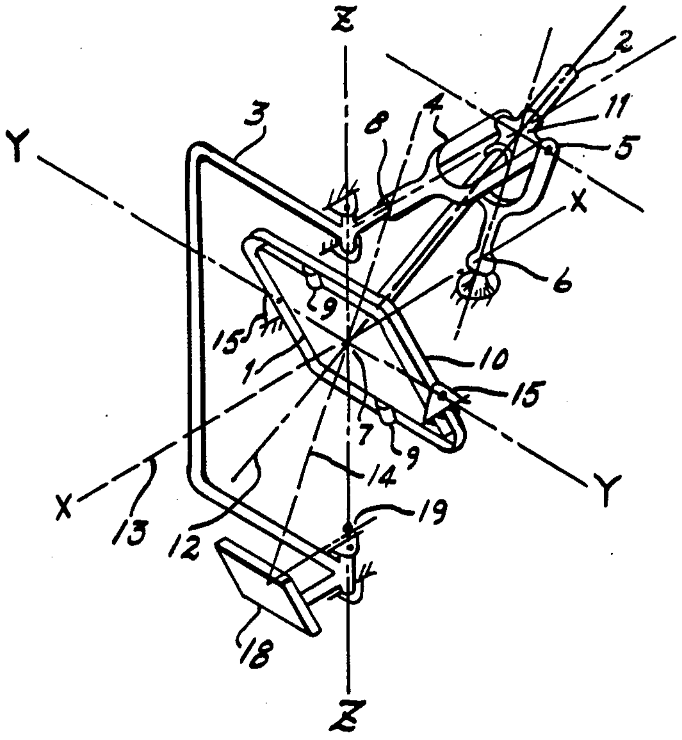
FIG. 4 is an isometric view of an alternative form of the invention.

Concerning FIG. 4, a mirror steering system like that shown in FIG. 1 is complimented with an extension of the arm to a second pivot point 19 on the *z—z* axis and the addition of a second mirror 18. The mirror 18 is placed to intercept reflected ray 14 and in turn reflect the beam to point 19 on the *z—z* axis. Angular displacement of mirror 18 with arm 3 along the *z—z* axis will direct the beam to point 19 from the radials of point 19.

By way of comparison, in the constructional form illustrated in FIG. 1 a beam may be directed to describe a circular arc onto a flat plane by positioning the device such that the axis 6–7 is coincident with the beam axis. In the constructional form illustrated in FIG. 4, a beam may be directed to a point in space from a radial direction by merely positioning the device such that the axis 6–7 is coincident with the beam axis.

Although only the preferred embodiments of the invention have been described above, it is not to be construed that it is limited to such embodiments. Other modifications may be made by those skilled in the art without departing from the spirit and scope of the invention defined below.

What is claimed is:

1. A mechanical mirror steering system comprising: a gimbal; a plane mirror pivotally mounted within the gimbal, a means for steering said plane mirror affixed to one side of the plane mirror and extending normal to the plane thereof, a first bifurcated link connected to a first universal swivel joint at one end; an arm means connected to a pivot for rotation about a first axis, said arm means having a second universal swivel joint atone end; a second bifurcated link connected to said second joint on said arm means to universally swivel thereby, and a slider bearing connecting said first and second links at their bifurcated ends and receiving, in a sliding relationship, said means for steering the plane mirror, whereby as the mirror rotates about said first axis radiation striking the mirror at a point along said first axis will describe a circular arc on a plane perpendicular to said first axis.

2. A mechanical mirror steering system according to claim 1 wherein said arm means includes an extension further connected to a second pivot for rotation about said first axis and a second plane mirror affixed to said extension whereby radiation reflected from a first mirror will be reflected from the second mirror to a point in space.

* * * * *